US007385505B2

(12) United States Patent
Bilodeau

(10) Patent No.: US 7,385,505 B2
(45) Date of Patent: Jun. 10, 2008

(54) MOTION DETECTING SYSTEM FOR ALARM DEVICE

(76) Inventor: Michel Bilodeau, 145, 2e avenue, Lasalle, QBC (CA) H8P 2G4

( * ) Notice: Subject to any disclaimer, the term of this patent is extended or adjusted under 35 U.S.C. 154(b) by 218 days.

(21) Appl. No.: 11/143,474

(22) Filed: Jun. 3, 2005

(65) Prior Publication Data

US 2006/0273899 A1 Dec. 7, 2006

(51) Int. Cl.
*G08B 13/08* (2006.01)
*G01F 1/00* (2006.01)
*H01J 9/00* (2006.01)

(52) U.S. Cl. .................. 340/547; 73/170.09; 335/206; 335/207

(58) Field of Classification Search ..................... None
See application file for complete search history.

(56) References Cited

U.S. PATENT DOCUMENTS 4,012,611 A * 3/1977 Petersen ............. 200/61.45 R
4,275,291 A * 6/1981 Feller .......................... 377/21
4,275,391 A 6/1981 Okamura
4,888,986 A * 12/1989 Baer et al. ............... 73/170.09
6,330,838 B1 * 12/2001 Kalsi ........................... 74/514

* cited by examiner

*Primary Examiner*—Julie Lieu
(74) *Attorney, Agent, or Firm*—Equinox Protection; Franz Bonsang

(57) ABSTRACT

A motion detecting system is attachable to an object for enabling and disabling an alarm flow of electrical current from a power source for actuating an alarm device. The system has a back plate with a substantially flat surface and a magnet freely pivotally mounted thereupon for generating a pivoting magnetic field that pivots with magnet in response to a motion of the object or of the system itself. System is set in an armed state by an electric pulse which causes at least one electrical contact is engaged by magnetic field in a first state to be set as an armed contact. When motion occurs, magnetic field pivots with magnet and armed contact in first state enters second state in which alarm flow is enabled for actuating alarm device. Contacts are spaced such that at least one contact is always engageable in first state.

14 Claims, 3 Drawing Sheets

MOTION DETECTING SYSTEM FOR ALARM DEVICE

FIELD OF THE INVENTION

The present invention relates to motion detecting systems, and more particularly to motion detecting systems for activating alarm devices.

BACKGROUND OF THE INVENTION

It is well known in the art to use motion detecting systems for controlling actuation of other devices, such as an alarm device connected thereto, in response to a motion of an object to which the motion detecting system is attached or of the system itself. In this fashion, the owner of the object or system can be alerted by an alarm emitted by the alarm device when the object or system is moved, which may suggest an attempt at theft or tampering with the object or system.

In order to detect such motion, many such motion detecting systems use magnets or magnetic devices. Typically, such motion causes a corresponding motion of the magnet or magnetic device, whose magnetic field causes an electrical contact to open or close, which, in turn, causes a signal or electric current to be transmitted to the alarm device. The electric current or signal then causes the alarm device to actuate and emit an alarm.

An example of such a system is described in U.S. Pat. No. 4,275,291, issued to Okamura on Jun. 23, 1981, which discloses a portable alarm device having a motion detecting system that senses motion of the alarm device corresponding to a motion of the object to which the alarm device, including the motion detecting system, is attached. The motion detecting system includes a pendulum with attached magnet, set in motion by motion of the alarm device, which causes closing of alarm circuit reed switches to actuate a continuous alarm. However, disadvantageously, the alarm device requires use of a key to disable the alarm while placing the alarm device on the object to ensure that the alarm device is not actuated during placement and arming of the alarm device.

Obviously, should the key be lost or damaged, operation and utility of the alarm device will be compromised as authorized motion of the object and/or alarm device, i.e. motion caused by a legitimate user or owner, will cause the alarm device to emit an alarm.

U.S. Pat. No. 4,888,986, issued to Baer et al. on Dec. 26, 1989, discloses a rotational position indicator having nine position sensors substantially equally spaced around the circumference of a circle and. an armature mounted for rotation on an axis located at the center of the circle. The armature is formed with two position magnets for activating the sensors mounted on arms of the armature at approximately one hundred and forty degrees relative to each other. Each magnet is mounted at a radial position for selectively actuating the position sensors upon rotation of the armature. An electric circuit is coupled to each position sensor for indicating actuation or not of the respective position sensor. The output provides a unique position code for successive intervals of angular positioning of the armature. The actuators have an actuating effect over a selected angular interval sufficient to produce thirty-six unique position codes for identifying successive ten degree intervals of angular positioning of the armature relative to the stator. By detecting changes in position, the indicator may detect motion. This position indicator, however, is needlessly complex for purposes of motion detecting for an alarm device, as, for such purposes, exact position need not be known. Rather, only changes in position, i.e. motion, need be detected to actuate the alarm device. Also, disadvantageously, since the detector only recognizes thirty-six positions representing ten degree arcs, changes in position in between any two adjacent positions of the thirty-six positions may be undetected. In such circumstances, problems may also arise in determining which position will be considered for initializing, i.e. arming, the system.

U.S. Pat. No. 4,012,611, issued to Petersen on Mar. 15, 1977, teaches an intrusion alarm device in which the motion detecting system comprises a body of predetermined mass suspended in pendulum-like fashion upon a rod or the like from a fixed point within a housing. A switch arrangement including a magnetically actuatable switch, with overlapping contacts, and a magnet is mounted with respect to the end portion of the rod and a fixed, null location upon the housing. Any relative movement between these components will activate a digital circuit which will activate the alarm device and sound an alarm. While the overlapping of the contacts helps bias the rod towards the null location in which the system is in an armed state, and thus resolves some of the difficulties related to arming the motion detecting system, it also requires, disadvantageously, use of relatively complex logic and relatively complex logic circuits.

Accordingly, there is a need for a simple, portable, and self-contained motion detecting system which is capable of being easily and consistently set in an armed state for arming the system.

SUMMARY OF THE INVENTION

It is therefore a general object of the present invention to provide an improved motion detecting system for an alarm device.

An advantage of the present invention is that the motion detecting system is easily placed in an armed state in that such an armed state will be available regardless of the position of the system.

Another advantage of the present invention is that the motion detecting system is self-contained and portable.

A further advantage of the present invention is that the motion detecting system is of simple design, without recourse to complicated logic or logic circuits.

According to a first aspect of the present invention, there is provided a motion detecting system attachable to an object for enabling and disabling an alarm flow of an electric current from a power source operatively connected to the system for actuating, when said system is in an armed state established by an electric pulse provided by the power source, an alarm device operatively connected thereto in response to a motion of at least one of the object, when the system is attached to the system, and the system, the system comprising:

- a plate having a substantially flat surface;
- a magnet freely pivotally mounted about a magnet pivot axis extending outwardly from the surface for generating a radially pivoting effective magnetic field that pivots with the magnet thereupon;
- a plurality of electrical contacts attached to the surface, at least one of the contacts being an armed contact set and maintained in a first state by the magnetic field when the electric pulse occurs for establishing the armed state of the system, the armed contact in the first state disabling the alarm flow to the alarm device until the armed contact enters a second state, in which the armed contact enables the alarm flow, upon disengaging from the magnetic field when the magnet pivots away from the armed contact in response to the motion and;

an electrical system activation switch selectively engageable in an activation position and a deactivation position, the activation switch, when in the activation position, forming an activation electrical connection through which the alarm flow passes between the power source, the system and the alarm device, the activation electrical connection being disabled when the activation switch is in the deactivation position, thereby deactivating the system and deactuating the alarm device.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will be better understood with reference to the description in association with the following Figures, in which similar references used in different Figures denote similar components, wherein.

DETAILED DESCRIPTION OF THE PREFERRED EMBODIMENTS

With reference to the annexed drawings the preferred embodiments of the present invention will be herein described for indicative purpose and by no means as of limitation.

Figure 1:
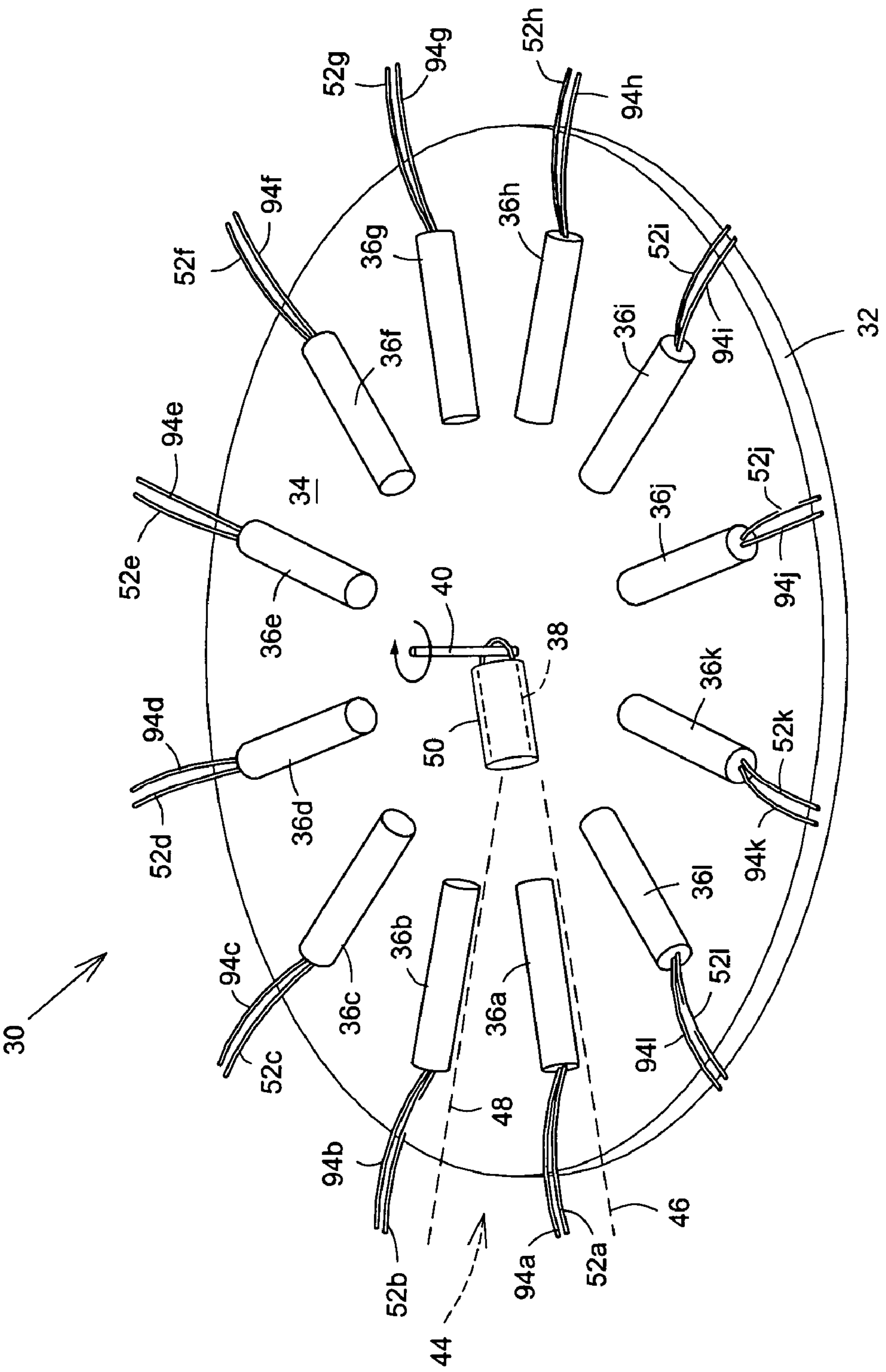
FIG. 1 is a top perspective view of an embodiment of a motion detecting system in accordance with the present invention.

Referring to FIG. 1, therein is shown an embodiment of a motion detecting system, shown generally as 30, in accordance with the present invention. Back-plate 32 of system 30 has a substantially flat surface 34 to which a plurality of electrical contacts 36 are attached. Electrical contacts 36 are substantially equally and circumferentially spaced with regard to each other and thus form a substantially circular shape. Magnet 38 is freely pivotally mounted about a magnet pivot axis 40 extending outwardly from surface 34 for generating a radially pivoting effective magnetic field, shown generally as 44, within the space defined between lines 46, 48 and which pivots with magnet 38 upon surface 34. As shown, magnet 38 is housed in a container 50 of substantially circular shape which is freely pivotally mounted on magnet pivot axis 40, thereby mounting magnet 38 on magnet pivot axis 40 on surface 34. Each contact 36 is engageable to form a connection between connectable between a corresponding contact input wire 52 and contact output wire 94.

Circular shape of container 50 facilitates pivoting movement of container 50 and, therefore, magnet 38 on surface 34. However, magnet 38 may also be directly mounted on magnet pivot axis 40, without container 50. In such cases, magnet 38 will itself be of substantially circular shape to facilitate pivoting movement around magnet pivot axis 40 on surface 34. Other shapes for magnet 38 and container 50 are possible provided they allow for pivoting movement thereof. It is not the intention of the inventor to limit the scope of the invention to magnets 38 and containers 50 of circular shape, nor to require use of container 50. Magnet 38 is preferably permanent in nature, although adaptation of system 30 for use with temporary or electro-magnets is also possible.

Magnet 38 is used for engaging electrical contacts 36 and placing them in a first state, for arming the system 30. Magnet 38 may also draw contacts into a second state in response to motion of system 30 or of an object, not shown, to which system 30 is attached. Advantageously, spacing of contacts 36 and magnet strength, which determines size of magnetic field 44, are such that at least one contact 36 is always situated within, i.e. engaged by, magnetic field 44, thus ensuring that system 30 can always be easily armed. Any configuration of placement of contacts 36 and strength of magnet 38 that permits such engagement is permissible. Therefore, while contacts 36 are substantially equally and circumferentially spaced to form a substantially circular shape in the embodiment shown, other embodiments having different placements and magnet strengths are also possible provided that at least one contact 36 is always engaged by magnetic field 44. It is not the intention of the inventors to limit the scope of the invention strictly to the configuration of magnet 38 and contacts 36 shown. Plate 32 may be produced from a variety of materials, provided that surface 34 is flat and that magnet 38 or container 50 can freely pivot thereon.

Figure 2:
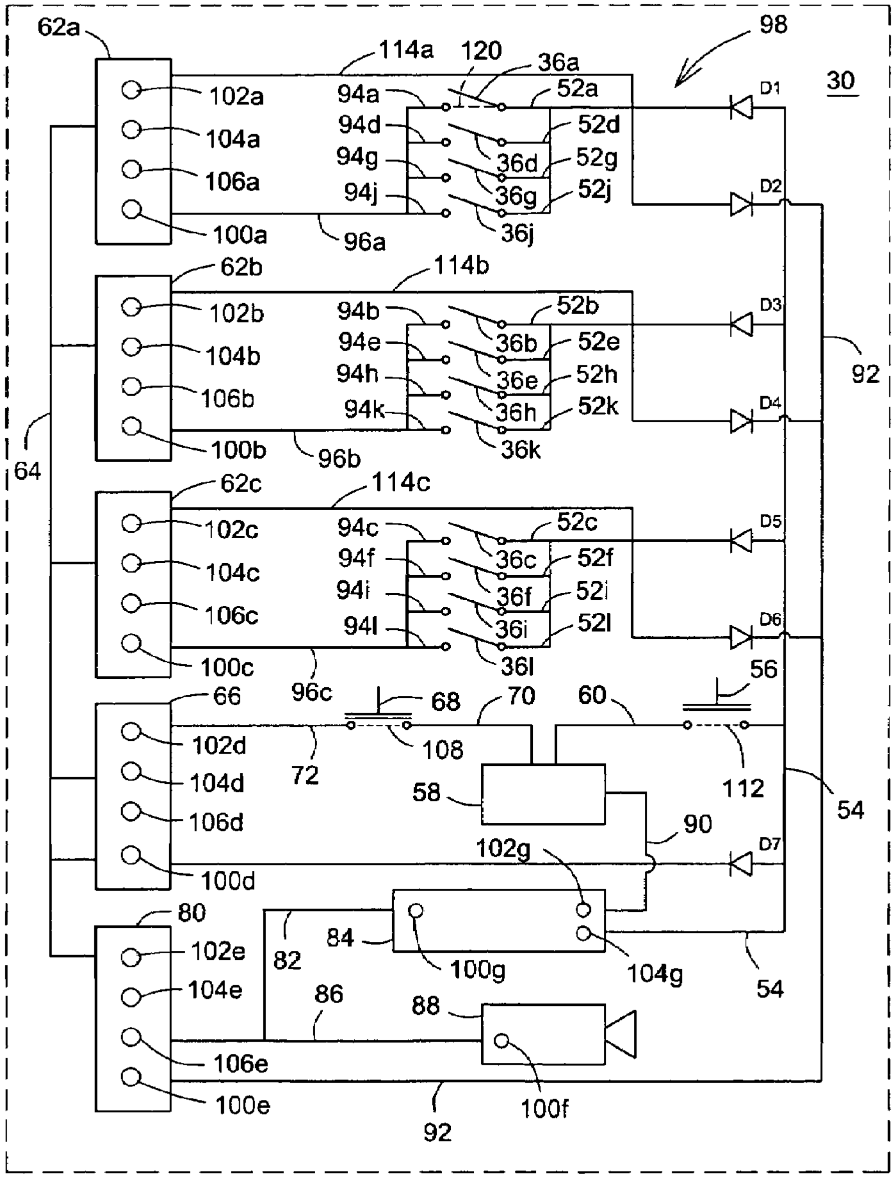
FIG. 2 is a schematic diagram of a circuit layout for the motion detecting system shown in FIG. 1.

Reference is now made to FIG. 2, a schematic diagram of an electric circuit, shown generally as 98, for the motion detecting system 30, in conjunction with FIG. 1. Contacts 36 are operatively connected by contact input wires 52, contact output wires 94, contact relay input wires 96, arming pulse wire 54, push switch wire 60 and push switch 56 to power source 58 for receiving an electric pulse of electric current from power source 58, while push switch 56 is depressed, for placing system 30 in an armed state. Contact input wire 52 for each contact 36 is connected to a contact relay 62 for the contact 36. Contact relay 62 is, in turn, connected by constant current wire 64, which carries a constant electric current, to power source relay 66. Power source relay is, in turn, operatively connected by activation wire 72, system activation switch 68 and power source wire 70 to power source 58. Constant current wire 64 is also connected to alarm relay 80, which is connected by timing wire 82 to timing device 84 and by alarm flow wire 86 to alarm device 88 for transmitting an alarm flow of electric current, when enabled, over wires 82 and 86, to timing device 84 and alarm device 88 for actuation thereof. Timing device 84 is also connected to power source 58 through timing supply wire 90 and to arming pulse wire 54. Thus, relays 62, 66, 80 and wires 52, 54, 60, 64, 70, 72, 82, 86, 94, 96, along with switches 56, 68, ensure that contacts 36 and system 30, are operatively connected to power source 58 and that the system is operatively connected to alarm device 88.

In the embodiment shown, power source 58 is an electric battery co-located with system 30 and which produces 12 volt positive electric current. Alarm device 88 is also co-located with system 30. Thus, system 30 is self-contained and portable, along with power source 58 and alarm device 88. However, other power sources, such as compact solar panels or fuel cells that generate electric current, are possible. Other voltages are also possible, provided power requirements of alarm device 88 are met. In addition, provided portability and self-containment are not required, power source 58 need not be co-located with system 30, provided additional wires or other connection means are available for connecting them. Similarly, alarm device 88 does not necessarily have to be co-located with system 30, provided there is some connection means available to connect them and ensure provision of electric current to alarm device 88. Alarm device 88 shown is a horn for emitting an audio alarm. However, any other alarm device, such as, for example, signal lights, or wireless alarm signal transmitters, may be substituted therefor. It is not the intention of the inventor to limit the placement of the alarm device 88 or power source 58, nor their exact compositions, to those specifically shown. Wires 52, 54, 60, 64, 70, 72, 82, 86, 94, 96 are comprised of electrically conductive material, such as copper or the like, through which electric current and electric pulse may pass.

Generally speaking, system 30 functions by enabling and disabling the alarm flow from power source 58 to alarm device 88. When the alarm flow is enabled, alarm device 88 is actuated and emits an alarm. When the alarm flow is disabled, alarm device 88 is deactuated. The alarm flow is enabled by system 30, when in an armed state, in response to a motion of an object, not shown, to which the system 30 is attached, or of the system 30 itself, which in turn causes magnet 38 to pivot. The armed state is established by an electric pulse provided and emitted from power source 58 and transmitted to contacts 36. When the electric pulse is emitted, at least one of contacts 36 will be situated in, and engaged by, effective magnetic field 44, which sets and maintains contact 36 in a first state as an armed contact 36. For example, as shown in FIG. 2, contact **36*a* is an armed contact 36*a*. Contacts 36 that are not situated in magnetic field 44 when electric pulse occurs are in a second, default state. As shown, armed contact 36*a* in first state is closed, as shown by line 120, in a closed state whereas contacts 36*b* through 36*l* in second state are open, in an open state. Alternatively, with modifications, the first state could be an open state and the second state could be a closed state. When in first state, armed contact 36 disables alarm flow, thus ensuring alarm device 88 is deactuated. When a motion of the object or system 30 occurs after system 30 is placed in the armed state, magnet 38 pivots in response thereto and, if armed contact 36 is disengaged from magnetic field 44 when magnet 38 pivots, armed contact 36 enters the second state and the alarm flow is enabled. The alarm device 88** is then actuated by the alarm flow.

Alarm device 88 typically remains actuated for a predetermined period of time, measured by timing device 84 which, at the end of the predetermined period, automatically emits another electric pulse to establish a new armed contact 36 and disable the alarm flow. Thus, system 30 is automatically reset at the end of the pre-determined time period and the armed state is automatically reestablished. Armed state is initially established manually, and may also be subsequently reestablished manually by depressing push switch 56, which also causes a new electric pulse to be emitted. In general, any armed contact 36 engaged in first state by magnetic field 44 when electric pulse is emitted is an armed contact 36. For example, if contact **36*b* were, in addition to contact 36*a*, in first state, i.e. in a closed state for the embodiment shown, when electric pulse was emitted, contacts 36*a*, 36*b* would both be armed contacts. System activation switch 68 may be used for disconnecting system 30, and alarm device 88, from electric current provided by power source 58, thus deactivating system 30. While push switch 56 and system activation switch 68 are shown as being co-located with system 30, they may be remotely controlled by a remote controller, not shown, provided a remote control receiver or the like, not shown, is installed in system 30 to receive signals for controlling switches 56, 68**.

Any electric circuit configuration that provides the above-described enabling and disabling of the alarm flow based on the establishment of an armed contact 36 in the first state, therefore establishing the armed state of system 30, and passage thereof from first state to second state based on pivoting of the magnet 38 in response to such motion will suffice for implementation of the present invention, provided contacts 36 and magnet 38 are configured such that at least one contact 36 is always engaged in magnetic field 44 for ensuring that one contact 36 is always available for setting as armed contact 36 in the first state. It is not the intention of the inventor to limit the scope of the invention to the electric circuit 98 specifically shown in FIG. 2. In addition, contacts 36 may be made of any electrically conductive material, for carrying electric current and electric pulse, that is also sufficiently responsive to magnet 38 to allow magnetic field 44 to engage contact 36 and cause contact 36 to enter first state.

Having generally described system 30, a more detailed description of the embodiment shown is now provided. As stated previously, contacts 36 are operatively connected to power source 58, alarm device 88, and timing device 84 by relays 62, 66, 80. Each relay 62, 66, 80 has positive connector (PC) 100, common connector (CC) 102, normally open connector (NOC) 104 and normally closed connector (NCC) 106 to which wires 52, 54, 60, 64, 70, 72, 82, 86, 94, 96 are connected for providing electric current or electric pulse thereto. When no electric current or electric pulse is so provided to PC 100, NCC 106 is closed and forms an electric connection with common connector 102 through which electric current or pulse may pass therebetween and to any wires 52, 54, 60, 64, 70, 72, 82, 86, 94, 96 which may be connected thereto. Conversely, NOC 104 is open and no connection exists between NOC 104 and CC 102 to allow electric current or electric pulse to pass therebetween. When electric current or pulse is provided to PC 100, the situation with regard to NOC 104 and NCC 106 is reversed. Specifically, NOC 104 is closed and forms an electric connection with CC 102 through which electric current or pulse may pass and NCC 106 is open preventing passage of electric current or pulse therefrom to CC 102.

System 30 is initially activated by sliding system activation switch 68 into an activation position such that the switch forms an electrical activation connection 108 connecting constant current wire 64 and power source wire 70, thereby allowing electric current, including the alarm flow, to pass from power source 58 therethrough to power source relay 66. Thus, from a high-level perspective, electrical activation connection 108, when enabled in conjunction with power source relay 66 and alarm relay 80, provides passage of electric current, including alarm flow, between power source 58, system 30, and alarm device 88. When activation switch 68 is placed in deactivation position, thus breaking and disabling activation connection 108, electric current, including alarm flow, is terminated. Therefore, system 30 is deactivated and alarm device 88 is deactuated.

Once system 30 is activated by placing system activation switch 68 in activation position 108, system 30 may be attached to an object and set in the armed state. Armed state of system is established, i.e. set, by depressing push switch 56, which creates electrical arming connection 112 between push switch wire 60 and arming pulse wire 54. Electric pulse is thus enabled and passes from power source 58 through electrical arming connection 112, via arming pulse wire 54 and contact input wires 52, to contacts 36. Concurrently, electric pulse is also passed through arming pulse wire 54 to PC 100*d* of power source relay 66 to which arming pulse wire 54 is connected. Electric pulse also flows, through arming pulse wire 54, to NOC 104*g* of timing device 84 to which arming pulse wire 54 is connected. However, at this point, since no electric current has yet been received on PC 100*g* of timing device 84, NOC 104*g* is open and there is no connection between CC 102*g* and NOC 104*g* through which electric pulse or electric current may pass.

When electric pulse reaches PC 100*d* of power source relay 66, NOC 104*d* of power source relay 66 closes and thus creates a connection, as described previously, through which electric current, including alarm flow, may pass between CC 102*d* and NOC 104*d*. Therefore, provided activation switch 68 is in activation position, constant electric current, including alarm flow, can now pass through activation wire 72, via CC 102*d* and NOC 104*d*, to constant current wire 64. Constant current wire 64 is connected to NOC 104*a*, 104*b*, 104*c*, of contact relays 62*a*, 62*b*, 62*c*, PC 100*d* and NOC 104*d* of power source relay 66, and to CC 102*e* of alarm relay 80 and circulates a constant electric current therealong, including the alarm flow to 102*e*. It should be noted that, since constant current wire 64 feeds electric current to PC 100*d*, this signifies that the connection between CC 102*d* and NOC 104*d* is maintained, which therefore sustains the flow of electric current passing from activation wire 72, via CC 102*d* and NOC 104*d*, to constant current wire 64 and, therefore, to connectors 100*d*, 102*e*, 104*a*, 104*b*, 104*c* until such time as supply of electric current to PC 100*d* is terminated, i.e. disabled.

When electric pulse reaches contact input wires 52, one of two things may occur. Each contact 36 is connectable to a contact output wire 94 which is in turn connected to a contact relay input wire 96 connected to PC 100 of contact relay 62. If contact 36 is in engaged in first state, i.e. in closed state for the embodiment shown, by magnetic field 44, contact 36 is an armed contact 36 forming an electrical connection through which electric pulse flows from the respective contact input wire 52 connected to the contact 36 to the respective contact output wire 94. The electric pulse then flows to the respective PC 100 of the respective contact relay 62 connected to the respective contact relay input wire 96 connected to the respective contact output wire 94. For example, in FIG. 2, contact 36*a* is in first, i.e. closed, state. Thus, the electric pulse would circulate from contact input wire 52*a* through armed contact 36*a* to contact output wire 94*a*, and then through contact relay input wire 96*a* to PC 100*a* of contact relay 62*a*. For those contacts 36 that are in second state, i.e. open state in the embodiment shown, there will be no electrical connection between those contacts 36 and their respective contact input wires 52 and contact output wires 94 and electric pulse will not flow therethrough. Contacts 36 in second, i.e. open, state are not armed contacts.

Upon receiving the electrical pulse, PC 100 of contact relay 62 connected to armed contact 36 will cause NOC 104 to close and from an electrical connection between CC 102 and NOC 104 of contact relay 62 connected to armed contact 36. Thus, constant electric current supplied from constant current wire 64, as described above, may flow from NOC 104 to CC 102, through contact relay output wire 114 and contact input wire 52, back to armed contact 36. Electric current may then pass again through armed contact 36, contact output wire 94, and contact relay input wire 96 to PC 100, thus ensuring that electrical connection between CC 102 and NOC 104 of contact relay 62 remains enabled to carry electric current until armed contact 36 passes into second state in response to a motion of system 30 or of object to which system 30 is attached that causes armed contact 36 to become disengaged from magnetic field 44 and to enter second state. For example, as shown in FIG. 2, if contact 36*a* is in first state, electric pulse and electric current will pass successively through pulse wire 54, contact input wire 52*a*, contact 36*a*, contact relay input wire 96*a*, to input PC 100*a* of relay 62*a*, where electrical connection between 104*a* and 102*a* will allow passage of electric current through contact relay output wire 114*a* back to contact input wire 52*a*, and contact 36*a*. At the same time, contact relay output wire 114*a* is also connected to alarm control wire 92, which carries electric current provided by contact relay output wire 114*a* to PC 100*e* of alarm relay 80. While receiving electric current, PC 100*e* causes NCC 106*e* to open, thus insuring there is no electrical connection between CC 102*e* and NCC 106*e*. Alarm flow of electric current in constant current wire 64 wire therefore cannot pass from CC 102*e* into alarm flow wire 86, via NCC 106*e* and the alarm flow to alarm device 88 is disabled. The disabling of the alarm flow ensures that alarm device 88 remains deactuated for as long as PC 100*e* receives electric current from alarm control wire 92, i.e. until armed contact 36 enters second state.

As mentioned previously, system 30 remains in armed state in which alarm flow to alarm device 88 is disabled until a motion of the system 30 or object to which system 30 is attached causes armed contact 36 to enter second state, i.e. an open state for the embodiment shown. When armed contact 36 enters second state, electric current can no longer flow therethrough and electric current to PC 100 of contact relay 62 connected to previously armed contact 36 that has just left first state and entered second state is disabled. NOC 104 of contact relay 62 connected to previously armed contact 36 opens and disables the electrical connection with CC 102 of contact relay 62, which prevents electric current from constant current wire 64 from flowing through contact relay 62 to contact relay output wire 114 for providing electric current to contact input wire 52 connected to previously armed contact 36. Since passage of electric current to contact relay output wire 114 is disabled, passage of electric current through alarm control wire 92 to PC 100*e* of alarm relay 80 is also terminated. Thus, PC 100*e* no longer receives electric current and NCC 106*e* closes and forms an electrical connection with CC 102*e* of alarm relay 80 through which alarm flow of electric current from constant current wire 64 may pass. Thus, alarm flow is enabled and passes through alarm flow wire 86 to PC 100*f* of alarm device 88 and thereby actuates the alarm device 88, which emits an alarm. Alarm flow of electric current also passes through timer wire 82, connected to alarm flow wire 86, to PC 100*g* of timer-device 84.

When electric current is received at PC 100*g* of timing device 84, timing device 84 is actuated and commences a cycle wherein timing device 84 counts down a pre-determined period of time. At the end of the pre-determined period of time, NOC 104*g* of timing device 84 closes and forms an electrical connection with CC 102*g* of timer device through which electric current may pass to arming pulse wire 54. The alarm device 88 remains actuated during the countdown of the pre-determined period of time. In the embodiment shown, the predetermined time period is approximately two (2) minutes, although any predetermined time period suitable for an application of the system 30 may be implemented by adjusting or substituting timing device 84. At the end of the predetermined period, i.e. the end of the cycle, timing device 84 briefly emits an electric pulse which passes through arming pulse wire 54 and contact input wires 52 to contacts 36. Contacts 36 in first, i.e. closed, state when electric pulse emitted by timing device 84 reaches contacts 36 become armed contacts 36 and system 30 is again placed in armed state and alarm device 88 is deactuated, as previously described. Thus, system 30 is automatically reset in armed state, reestablished by electric pulse from timing device 84, at the end of the pre-determined time period. System 30 may also be manually reset in armed state at any time, including the pre-determined time period, by depressing push switch 56, which causes an electric pulse to be emitted and recommences the process of placing system 30 in armed state, as described above. System 30 may be completely deactivated, including deactuation of alarm device 88, at any time by placing slide switch in deactivation position, which terminates provision of electric current, including alarm flow, over constant current wire 64, to the system 30.

It is possible that, depending on the size of magnetic field 44, two or more adjacent contacts 36 may be in first state when electric pulse is emitted and reaches contacts 36. In such case, all contacts 36 in first state will become armed contacts 36. For example, in the embodiment shown, if magnet 38 and magnetic field 44 were slightly displaced in a clockwise direction, both contacts 36*a* and 36*b* would be engaged in closed state by magnetic field 44 when electric pulse reached them. Thus, there would be two armed contacts 36*a*, 36*b*. In such a situation, the conduct of system 30 would be the same as when there is only one armed contact 36, such as 36*a*. However, electric current would circulate from all contact relays 62 connected to armed contacts 36 to alarm control wire 92 and therefore to PC 100*e* of alarm relay 80. Accordingly, supply of electric current to PC 100*e* is only terminated, and alarm flow enabled, once each armed contact 36 has at least momentarily passed into second state, i.e. left first state. Thus, for the embodiment shown, if there were two armed contacts 36*a*, 36*b*, then electric current would flow from contact relays 62*a*, 62*b*, via relay output wires 114*a*, 114*b*, through alarm control wire 92 to PC 100*e*, thereby maintaining alarm flow disabled, until each armed contact 36*a*, 36*b* had passed, at least temporarily, into an open state. Adjacent contacts 36 are connected to different contact relays 62, therefore assuring, in the embodiment shown, that the same contact relay 62 does not provide electric current to PC 100*e*, via contact relay output wire 114 and alarm control wire 92, when there are multiple armed contacts 36. Thus, it is not necessary that both armed contacts 36 be in second state at the same time to enable alarm flow, since passage of electric current from each respective contact relay 62 connected to an armed contact 36 to PC 100*e* will be terminated as soon as the respective armed contact 36 leaves first state.

The distribution of adjacent contacts 36 on different contact relays 62 also prevents situations wherein a series of adjacent contacts 36 connected to the same contact relay 62 could become armed contacts 36 on a cascading basis, which could delay termination of electric current to PC 100*e* and actuation of alarm device 88. For example, if contacts 36*a*, 36*b*, 36*c*, 36*d* were connected to contact relay 62*a* and contacts 36*a* and 36*b* were armed contacts, it might be possible that, as contact 36*a* became disengaged from magnetic field 44, that contact 36*c* could enter first state and become armed contact 36*c*. Similarly, as contact 36*b* became disengaged from magnetic field 44 and entered second state, contact 36*d* could enter first state and become armed contact 36*d*. In such a situation, originally armed contacts 36*a*, 36*b* would both have left first state and entered second state, but electric current would still be provided by contacts 36*c*, 36*d* to PC 100*e* and alarm flow would remain disabled. Connecting adjacent contacts 36 to different contact relays 62 avoids this situation for the embodiment shown while still ensuring that at least one contact 36 is always engageable as an armed contact 36 when electric pulse is emitted. From a more generic perspective, one can assure that two armed contacts 36 are never connected to the same contact relay 62 by sizing the magnetic field and number of contact relays 62 such that the number of contact relays 62 is at least equal to the maximum number of contacts 36 that can be engaged by magnetic field 44 at any one moment in first state. Adjacent contacts 36 are then sequentially connected to sequential contact relays 62, ensuring that the next sequential contact 36 to be connected is not added to a given contact relay 62 unless addition of the next sequential contact 36 to the given contact relay 62 will make the number of contacts 36 attached thereto equal to or one greater than the number of contacts 36 contacted to each other contact relay 62. In this fashion, a number of zones, equal to the number of contacts 36 that can be engaged at any one moment by magnetic field 44 is established, with each sequential adjacent contact 36 being in a different zone.

Figure 3:
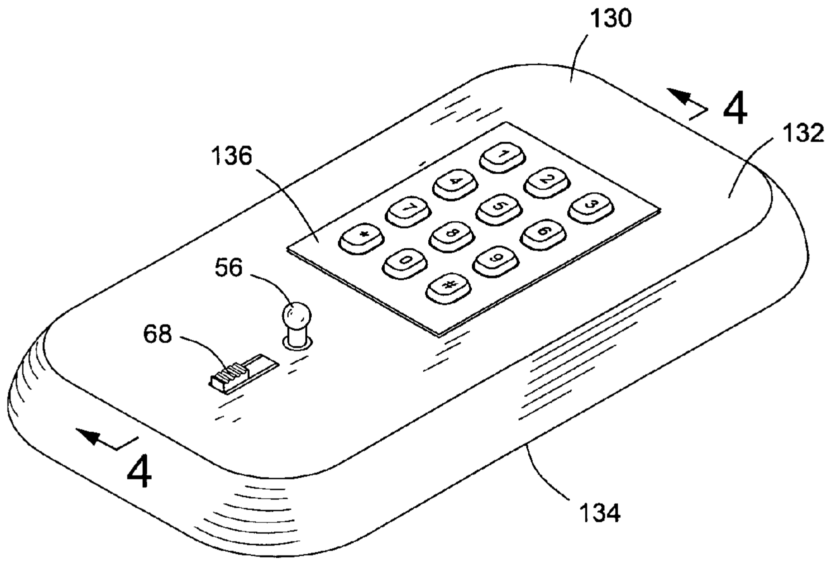
FIG. 3 is a simplified perspective view of a casing in which the system shown in FIG. 1 is housed.
Figure 4:
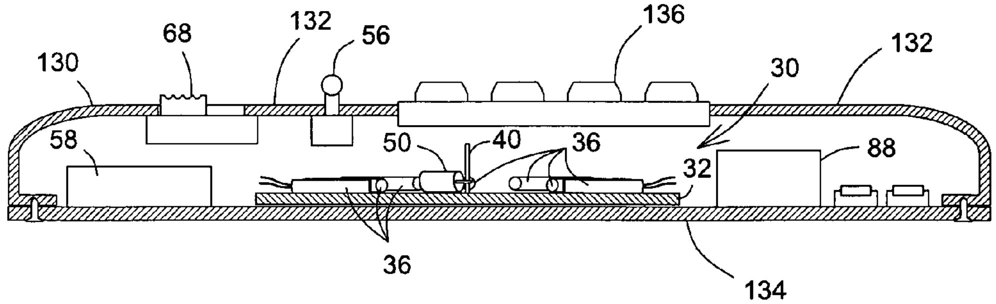
FIG. 4 is a cross sectional view of the system housed in the casing shown in FIG. 3.

Turning now to FIGS. 3 and 4, therein are shown, respectively, a simplified perspective view and a simplified cross sectional view of the system 30 placed, along with alarm device 88 and power source 58, in a compact casing 130. Push switch 56 and system activation switch 68 are situated on the top end 132 of the casing 130, whereas backplate 32 is located on the generally opposed bottom end 134 thereof. It should be noted, however, that switches 56, 68 may discreetly positioned elsewhere on casing, so as to be less readily visible. In addition, optional keyboard 136 is also situated on top end 132 and may be used for entering a security code such that a control system, not shown, will be selectively actuated and deactuated for adding additional security for controlling emission of electric pulse and arming and resetting system 30.

Although the present motion detecting system 30 has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A motion detecting system attachable to an object for enabling and disabling an alarm flow of an electric current from a power source operatively connected to said system for actuating, when said system is in an armed state established by an electric pulse provided by the power source, an alarm device operatively connected to said system, in response to a motion of at least one of the object, when said system is attached thereto, and said system, said system comprising:

- a plate having a substantially flat surface;
- a magnet freely pivotally mounted about a magnet pivot axis extending outwardly from said surface for generating a radially pivoting effective magnetic field that pivots with said magnet thereupon;
- a plurality of electrical contacts attached to said surface, at least one of said electrical contacts being an armed contact set and maintained in a first state by said magnetic field when the electric pulse occurs for establishing the armed state of said system, said armed contact in said first state disabling the alarm flow to the alarm device until said armed contact enters a second state, in which the armed contact enables the alarm flow, upon disengaging from said magnetic field when said magnet pivots away from said armed contact in response to the motion;

a timing device operatively connected to the power source and the alarm device for maintaining the alarm flow from the power source to the alarm device for maintaining actuation thereof for a pre-determined period of time; and wherein said timing device causes the electricpulse to be transmitted again after said pro-determined period of time has expired for setting at least one of said electrical contacts as said armed contact, thereby deactuating the alarm device and reestablishing the armed state of said system.

2. The system of claim 1, wherein, when in said first state, said armed contact is closed in a closed state and, when in said second state, said armed contact is open in an open state.

3. The system of claim 1, wherein, when in said first state, said armed contact is open in an open state and, when in said second state, said armed contact is closed in a closed state.

4. The system of claim 1, wherein said electrical contacts are substantially equally spaced around said magnet pivot axis such that at least one of said electrical contacts is engaged within said magnetic field while said magnet pivots.

5. The system of claim 4 wherein said electrical contacts are substantially circumferentially equally spaced to form a substantially circular shape about said magnet pivot axis, said magnet pivot axis being situated in a substantially radial position relative thereto and said magnet thereby generally pivoting thereabout said radial position in a center of said circular shape.

6. The system of claim 1, wherein said at least one contact of said electrical contacts comprises a plurality of said armed contacts, said plurality of said armed contacts being adjacent to one another, the alarm flow being enabled when each said armed contact has at least temporarily entered said second state upon being disengaged from said magnetic field when said magnet pivots away therefrom in response to the motion.

7. The system of claim 1, further comprising an electrical push switch located between said electrical contacts and the power source for forming an arming electrical connection therebetween, the electric pulse being transmitted from the power source and carried through said arming electrical connection to said electrical contacts when said push switch is depressed for establishing said armed contact and thereby deactuating the alarm device and establishing the armed state of said system.

8. The system of claim 2, further comprising at least one contact relay, operatively connected to said electrical contacts and the power source, and an alarm relay operatively connected to said alarm device, said at least one contact relay, and the power source, said contact relay receiving the electric pulse from said armed relay in said first state, when said system is armed, and subsequently transmitting the electric current to said alarm relay until said armed contact enters said second state, said alarm relay continuously disabling the alarm flow from the power source therethrough to the alarm device while receiving the electric current from the contact relay and enabling the alarm flow therethrough to actuate the alarm device when said armed contact enters said second state.

9. The system of claim 8, wherein said at least one contact relay comprises a plurality of contact relays.

10. The system of claim 8, further comprising a power source relay operatively connected to the power source, said contact relay and said alarm relay, said power source relay also receiving the electric pulse when said system is armed, said power source relay transmitting the alarm flow to said alarm relay and the electric current to said contact relay for subsequent transmission, through said armed contact, to said alarm relay for disabling the alarm flow from said alarm relay to the alarm device.

11. The system of claim 9, wherein adjacently positioned said contacts are respectively operatively connected to different said contact relays.

12. The system of claim 1, wherein said magnet is substantially cylindrically shaped to facilitate pivoting thereof.

13. The system of claim 1, wherein said magnet is housed in a container of substantially cylindrical shape, said container being freely pivotally mounted on said magnet pivoting axis, said cylindrical shape facilitating pivoting of said container and thereby of said magnet on said surface.

14. The system of claim 1, further comprising an electrical system activation switch selectively engageable in an activation position and a deactivation position, said activation switch, when in said activation position, forming an activation electrical connection through which the alarm flow passes between the power source, said system and the alarm device, said activation electrical connection being disabled when said activation switch is in said deactivation position, thereby deactivating said system and deactuating said alarm device.

* * * * *